(12) United States Patent
Brushkivskyy

(10) Patent No.: US 11,473,671 B2
(45) Date of Patent: Oct. 18, 2022

(54) MOTOR VEHICLE TRANSMISSION

(71) Applicant: ZF Friedrichshafen AG, Friedrichshafen (DE)

(72) Inventor: Vyacheslav Brushkivskyy, Kressbronn am Bodensee (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

(21) Appl. No.: 17/028,264

(22) Filed: Sep. 22, 2020

(65) Prior Publication Data

US 2021/0095743 A1 Apr. 1, 2021

(30) Foreign Application Priority Data

Sep. 27, 2019 (DE) ..................... 10 2019 214 843.3

(51) Int. Cl.
*F16H 57/08* (2006.01)
*F16H 3/66* (2006.01)
*F16H 57/04* (2010.01)

(52) U.S. Cl.
CPC ............. *F16H 57/08* (2013.01); *F16H 3/66* (2013.01); *F16H 57/043* (2013.01); *F16H 2200/0052* (2013.01); *F16H 2200/201* (2013.01); *F16H 2200/2043* (2013.01)

(58) Field of Classification Search
CPC ...... F16H 57/08; F16H 3/66; F16H 2200/201; F16H 3/44; B23P 15/14
See application file for complete search history.

(56) References Cited

U.S. PATENT DOCUMENTS 4,070,927 A 1/1978 Polak
5,676,617 A * 10/1997 Tabata ..................... F16H 3/66
475/288

FOREIGN PATENT DOCUMENTS

DE 27 21 719 A1 12/1977
DE 10 2016 201 225 A1 1/2017
DE 10 2016 224 458 A1 6/2018

OTHER PUBLICATIONS

German Search Report Corresponding to 10 2019 214 843.3 dated May 4, 2020.

* cited by examiner

*Primary Examiner* — Erin D Bishop
(74) *Attorney, Agent, or Firm* — Finch & Maloney PLLC; Jay S. Franklin; Michael J. Bujold

(57) ABSTRACT

A motor vehicle transmission having a planetary gear system with three coaxially arranged gearsets (RS1, RS2, RS3) coupled to one another. The first gearset (RS1) includes a first sun gear (SR1), a first planet carrier (ST1) and a first ring gear (HR1). The second gearset (RS2) includes a second sun gear (SR2), a second planet carrier (ST2) and a second ring gear (HR2), and the third gearset (RS3) includes a third sun gear (SR3), a third planet carrier (ST3) and a third ring gear (HR3). The second and third gearsets (RS2, RS3) have the same stationary gear ratio and the second and third sun gears (SR2, SR3) are arranged in a rotationally fixed manner on a common driveshaft (AW). The second and third sun gears (SR2, SR3) are made integrally with the driveshaft (AW).

8 Claims, 3 Drawing Sheets

MOTOR VEHICLE TRANSMISSION

This application claims priority from German patent application serial no. 10 2019 214 843.3 filed Sep. 27, 2019.

FIELD OF THE INVENTION

The invention relates to a motor vehicle transmission comprising a planetary gear system with three gearsets arranged coaxially and coupled with one another.

BACKGROUND OF THE INVENTION

Such a motor vehicle transmission with three planetary transmission gearsets, called gearsets for short, has become known from DE 10 2016 224 458 A1. The known planetary transmission comprises a first, a second and a third planetary gearset, wherein each gearset has a sun gear, a planet carrier with planetary gearwheels and a ring gear. The gearsets can be coupled to one another, and by actuating shifting elements (brakes and clutches) various gears can be engaged. The sun gears of the second and third planetary gearsets are connected to one another in a rotationally fixed manner by a central shaft, which forms a conjoint sun shaft. In one of various embodiments two gearsets, preferably the second and the third gearsets, have the same stationary gear ratio. A stationary gear ratio for a planetary gearset is obtained by the rotation speed ratio of the sun gear and the ring gear when the planet carrier is held fixed.

SUMMARY OF THE INVENTION

A purpose of the present invention is to maximize the potential for reducing costs during the production of the planetary transmission.

The invention includes the characteristics specified in the independent claim(s). Advantageous design features emerge from the subordinate claims.

According to the invention, it is provided in a motor vehicle transmission of the type mentioned to begin with, that the second and third sun gears are made integrally with the driveshaft, i.e. the sun gears, including their two running-gearteeth sets, are completely integrated in the driveshaft. This gives the advantage that the two running-gearteeth sets, which mesh with the planetary gearwheels of the respective gearsets, can be made in a single working step and with one clamping operation of the driveshaft, so that the production preferably takes place by milling of the teeth. This results in a considerable cost saving compared with the prior art, in which one of the two sun gears is made as a separate gearwheel and then joined to the driveshaft.

In a preferred embodiment, the outer diameters of the two sun gears and in particular also of their running-gearteeth sets, are the same, which again has cost advantages. Thus, the teeth of the two sun gears can be produced using the same tool.

According to a further preferred embodiment, the driveshaft has driving teeth which are worked into the driveshaft and are therefore also formed integrally with the driveshaft. For the second and third sun gears, respectively of the second and third gearsets, the driveshaft forms a conjoint sun shaft which can be driven by a transmission input shaft, if needs be by way of a shifting clutch. The torque transmission from the drive input of the transmission to the driveshaft takes place by virtue of the driving teeth.

BRIEF DESCRIPTION OF THE DRAWINGS

An example embodiment of the invention is illustrated in the drawings and will be described in greater detail below, so that from the description and/or the drawings further features and/or advantages may emerge. The drawings show.

DETAILED DESCRIPTION OF THE PREFERRED EMBODIMENTS

Figure 1:
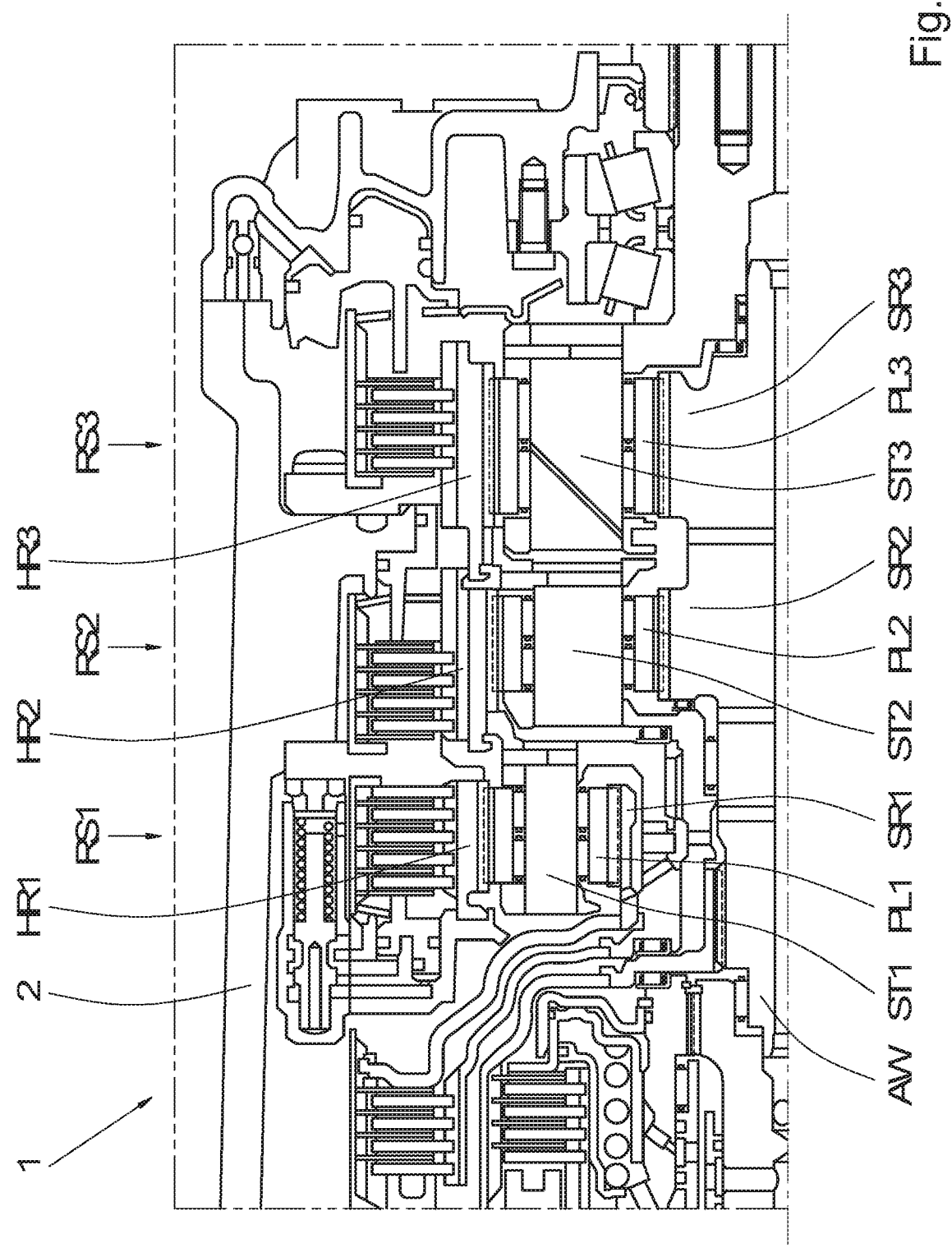
FIG. 1: A sectional view of the planetary gear system according to the invention, with three gearsets.

FIG. 1 shows a partial section of a motor vehicle transmission 1 with a transmission housing 2, in which a planetary gear system (not indexed) comprising three gearsets RS1, RS2, RS3 is arranged. The first gearset RS1 has a first sun gear SR1, a first planet carrier ST1 (here represented by a planetary bolt connected to the first planet carrier ST1) and a first ring gear HR1.

Mounted to rotate on the planetary bolt of the first planet carrier ST1 is a first planetary gearwheel PL1, which meshes with the first sun gear SR1 and the first ring gear HR1. The second gearset RS2 has a second sun gear SR2, a second planet carrier ST2 (here represented by a planetary bolt connected to the second planet carrier ST2) and a second ring gear HR2. A second planetary gearwheel PL2 is mounted to rotate on the planetary bolt of the second planet carrier ST2. A third gearset RS3 comprises a third sun gear SR3, a third planet carrier ST3 (here represented by a planetary bolt connected to the third planet carrier ST3) and a third ring gear HR3. A third planetary gearwheel PL3 is mounted to rotate on the planetary bolt ST3.

The second sun gear SR2 and the third sun gear SR3 are arranged on a driveshaft AW and are made integrally with the driveshaft AW. Thus, the driveshaft AW forms a conjoint sun shaft of the second sun gear SR2, that of the second gearset RS2, and of the third sun gear SR3, that of the third gearset RS3. The driveshaft AW can be driven by a shifting element (not indexed). The first, second and third gearsets RS1, RS2, RS3 can be coupled with one another in various shift configurations, which takes place by the actuation of shifting elements (not indexed). As regards its kinematic coupling variants, the planetary transmission shown, with its three gearsets RS1, RS2, RS3, enables the engagement of six forward gears and one reversing gear, as described in DE 27 21 719 A, to which reference should be made in this connection.

Figure 2:
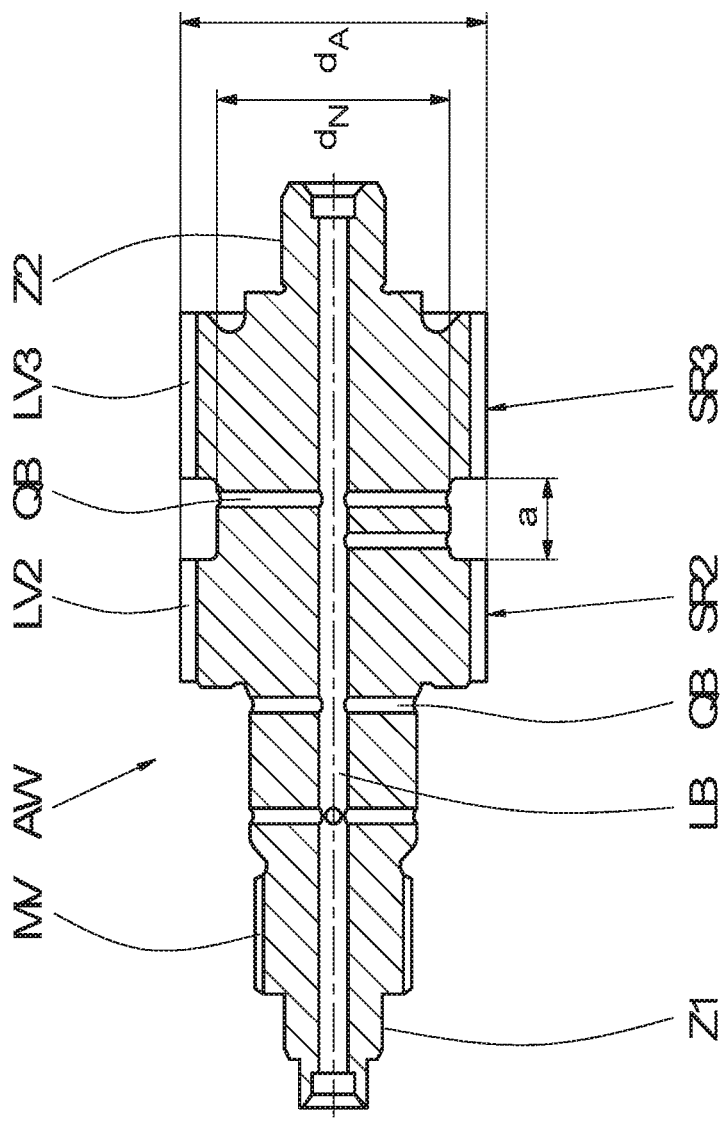
FIG. 2: A sectional view of a driveshaft with integrated sun gears for the second and third gearsets.

FIG. 2 shows a cross-section of the driveshaft AW according to FIG. 1 as an individual component. The driveshaft AW shown is made integrally, i.e. made as a single piece and machined as such. On the driveshaft AW are arranged, an axial distance a apart, the second sun gear SR2 with its running-gearteeth set LV2 and the third sun gear SR3 with its running-gearteeth set LV3. The second sun gear SR2 and the third sun gear SR3 are formed integrally with the driveshaft AW and have the same outer diameter $d_A$ and the same running-gearteeth sets LV2, LV3 respectively. The two running-gearteeth sets LV2, LV3, which mesh with the planetary gearwheels PL2, PL3 (FIG. 1) of the gearsets RS2, RS3 (FIG. 1), can therefore be produced in a single working step using the same tool. For that purpose a groove of width a and with a groove diameter $d_N$, which is smaller than the root diameter of the gearteeth sets LV2, LV3, is provided. In relation to the second and third gearsets RS2, RS3 (FIG. 1) the driveshaft AW forms a conjoint sun shaft, which couples the two gearsets RS2, RS3 to one another. At its end on the left in the drawing the driveshaft AW has driving teeth MV, which are formed in the driveshaft AW—for example by machining. By virtue of the driving teeth MV the driveshaft AW can be driven by a driving component (not shown here). The drive-power to the driveshaft AW and hence also the drive-power to the two sun gears SR2, SR3 can be engaged or disengaged by means of a shifting clutch (FIG. 1). At its ends the driveshaft AW has a first bearing journal Z1 and a second bearing journal Z2, by which the driveshaft AW is rotatably supported relative to the transmission housing 2 (FIG. 1). The driveshaft AW has a central, through-going longitudinal bore LB from which various transverse bores QB branch off, which serve to carry lubrication oil to the bearings and gearsets. At least one transverse bore QB opens into the groove provided between the running gearteeth sets LV2, LV3 in order to supply lubricating oil to the gearsets RS2, RS3. In the driveshaft AW shown in FIG. 2 three transverse bores QB open into the groove between the running-gearteeth sets LV2, LV3.

Figure 3:
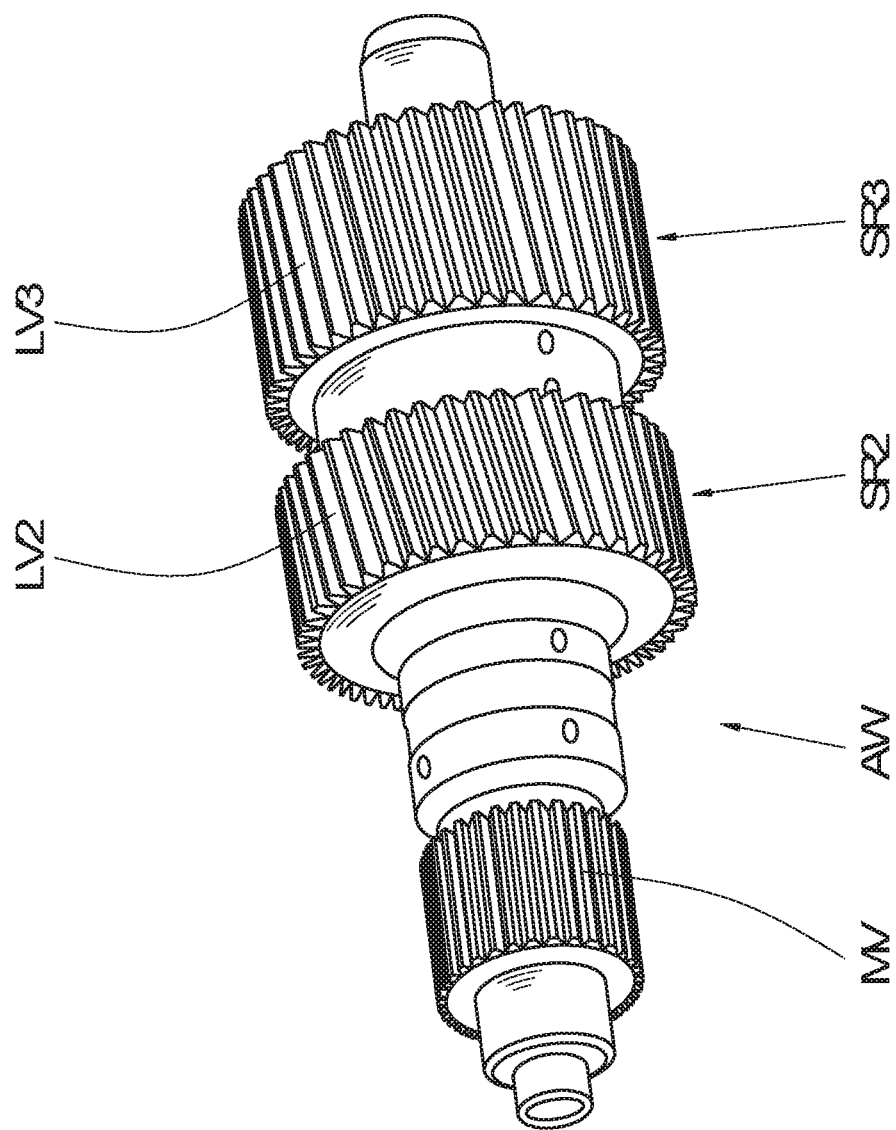
FIG. 3: A perspective view of the driveshaft according to FIG. 2.

FIG. 3 shows a perspective view of the driveshaft AW of FIG. 2. The two sun gears SR2, SR3 have running-gearteeth sets LV2, LV3 formed with the same helical teeth. Thus, the teeth of the two sun gears RS2, RS3 can be made like gearteeth of a correspondingly wider gearwheel. The driving teeth MV have a known tooth profile, for example a spline-shaft profile.

INDEXES

1 Motor vehicle transmission
2 Transmission housing
a Distance
AW Driveshaft
$d_A$ Outer diameter/sun gear
$d_N$ Groove diameter
HR1 First ring gear
HR2 Second ring gear
HR3 Third ring gear
LB Longitudinal bore
LV2 Running gearteeth set
LV3 Running gearteeth set
MV Driving teeth
PL1 First planetary gearwheel
PL2 Second planetary gearwheel
PL3 Third planetary gearwheel
QB Transverse bore
RS1 First gearset
RS2 Second gearset
RS3 Third gearset
SR1 First sun gear
SR2 Second sun gear
SR3 Third sun gear
ST1 First planet carrier
ST2 Second planet carrier
ST3 Third planet carrier
Z1 First bearing journal
Z2 Second bearing journal

The invention claimed is:

1. A motor vehicle transmission comprising:
a planetary gear system with first, second and third coaxially arranged gearsets coupled to one another,
the first gearset comprising a first sun gear, a first planet carrier and a first ring gear,
the second gearset comprising a second sun gear, a second planet carrier and a second ring gear,
the third gearset comprising a third sun gear, a third planet carrier and a third ring gear,
the second sun gear and the third sun gear having the same outer diameter and the same stationary gear ratio so that running-gearteeth sets of the second sun gear and the third sun gear are produced during a working step using one tool,
the second sun gear and the third sun gear being arranged in a rotationally fixed manner on a common driveshaft, and
the second sun gear and the third sun gear both being formed integrally, from a single piece of material, with the driveshaft so that the second sun gear, the third sun gear and the driveshaft are all permanently connected to one another.

2. The motor vehicle transmission according to claim 1, wherein the running-gearteeth sets of the second sun gear and the third sun gear are identical.

3. The motor vehicle transmission according to claim 1, wherein the driveshaft has an integral set of driving teeth.

4. The motor vehicle transmission according to claim 1, wherein a groove, having a width, is formed in the driveshaft and separates the second sun gear from the third sun gear, and a diameter of the groove is smaller than a root diameter of the running-gearteeth sets of the second sun gear and the third sun gear.

5. The motor vehicle transmission according to claim 1, wherein driving teeth are formed in the driveshaft remote from the second gearset and the third gearset, and the driving teeth facilitate driving of the driveshaft by a transmission driving component.

6. The motor vehicle transmission according to claim 1, wherein the running-gearteeth sets are formed with identical helical teeth.

7. The motor vehicle transmission according to claim 1, wherein the driveshaft has a longitudinal bore from which a plurality of transverse bores branch off, and the longitudinal and the transverse bores carry lubrication oil to bearings and the first, the second and the third gearsets of the planetary gear system.

8. A motor vehicle transmission comprising:
a planetary gear system with first, second and third coaxially arranged gearsets coupled to one another,
the first gearset comprising a first sun gear, a first planet carrier and a first ring gear,
the second gearset comprising a second sun gear, a second planet carrier and a second ring gear,
the third gearset comprising a third sun gear, a third planet carrier and a third ring gear,
the second sun gear and the third sun gear having the same outer diameter and the same stationary gear ratio so that running-gearteeth sets of the second sun gear and the third sun gear are produced during a working step using one tool,
the second sun gear and the third sun gear being arranged in a rotationally fixed manner on a common driveshaft,
a groove, having a width, being formed in the driveshaft and separating the second sun gear from the third sun gear, and a diameter of the groove being smaller than a root diameter of the running-gearteeth sets of the second sun gear and the third sun gear,
the driveshaft having a longitudinal bore from which a plurality of transverse bores branch off, and the longitudinal and the transverse bores carrying lubrication oil to bearings and the first, the second and the third gearsets of the planetary gear system, and
the second sun gear and the third sun gear both being formed integrally, from a single piece of material, with the driveshaft so that the second sun gear, the third sun gear and the driveshaft are all permanently connected to one another and always rotate in unison with one another.

* * * * *